United States Patent Office

2,956,049
Patented Oct. 11, 1960

2,956,049

α-CHLOROACRYLIC ACID ESTER COMPOSITIONS AND METHOD OF PRODUCING SHAPED ARTICLES THEREFROM

Harry D. Anspon, Easton, and Frank E. Pschorr, Phoenixville, Pa., assignors to General Aniline & Film Corporation, New York, N.Y., a corporation of Delaware No Drawing. Filed Sept. 10, 1956, Ser. No. 608,695

10 Claims. (Cl. 260—89.5)

This invention relates to the polymerization of α-chloroacrylic acid esters, and relates more particularly to a novel method of regulating the polymerization of α-chloroacrylic acid esters.

As is well known, monomeric esters of α-chloroacrylic acid may be introduced into molds suitable to form shaped articles, such as sheets, for example, and be polymerized in said molds to thermoplastic resins having exceptional physical and chemical properties. Casting procedures which may be employed are disclosed in our Patent No. 2,593,827 and our Patent No. 2,848,753.

Examples of α-chloroacrylic acid esters which may be cast into shaped products by mass polymerization are alkyl esters, such as methyl, ethyl, propyl, isopropyl, butyl, amyl, isoamyl, hexyl, octyl and lauryl esters; the alkenyl esters, such as allyl, methallyl and crotyl esters; the polyhydric alcohol esters, such as ethylene glycol and the 1,4-butanediol esters; the cycloalkyl esters, such as cyclohexyl and methylcyclohexyl esters; the aralkyl esters, such as the benzyl esters; the aryl esters, such as phenyl and tolyl esters and the heterocyclic esters, such as the tetrahydrofurfuryl ester.

In the procedures heretofore employed in the forming of shaped articles, such as a sheet of an α-chloroacrylic acid ester, the ester was employed in monomeric form and was mixed with a polymerization catalyst, e.g. organic peroxide, such as benzoyl peroxide or di-tertiary butyl peroxide, and the mixture was introduced in liquid form into a glass casting cell or other mold and the polymerization of the ester effected by heating to the required temperature or in any other well known manner. In the prior processes, it was necessary to exercise care of the highest order in filling the casting cell or mold to the desired level and maintaining this level. Moreover, molds of precision workmanship had to be employed. Without these precautions, it was almost impossible to obtain sheets of satisfactory physical characteristics, such as, for example, uniform thickness and freedom from bubbles and surface defects. The disadvantages of the prior processes were due to the fact that the freely flowing monomeric ester leaked from the casting cell or mold and also to the fact that upon polymerization an excessive shrinkage of the product occurred.

It is, accordingly, an important object of our invention to provide a novel process for forming shaped articles which will be free from the foregoing and other disadvantages.

Another object of our invention is the provision of a viscous casting syrup or dope which, when used in a casting cell or mold, effects a reduction in the degree of shrinkage and the extent of leakage from the casting cell or mold.

A further object of our invention is a novel process for inhibiting or regulating the polymerization of α-chloroacrylic acid esters when the said esters are subjected to polymerization conditions.

Other objects and advantages of our invention will appear from the following detailed description and claims.

In accordance with our invention, we first prepare a mixture of monomeric α-chloroacrylic acid ester, polymerization catalyst and an acid which inhibits or regulates the polymerization of the α-chloroacrylic acid ester. This mixture is then subjected to polymerization conditions for a time sufficient to partially polymerize the α-chloroacrylic acid ester whereby there is obtained a mixture of monomeric α-chloroacrylic acid ester and polymeric α-chloroacrylic acid ester, which mixture is viscous and smoothly flowing. When this monomer-polymer mixture is employed as the casting syrup, it is found that shrinkage is reduced and leakage is substantially eliminated and that the casting molds do not require exceptional workmanship or attention.

Our invention will now be described more specifically in connection with methyl α-chloroacrylate which at the present time is employed in the production of transparent sheets having highly desirable characteristics. Methyl α-chloroacrylate can be polymerized under suitable polymerization conditions to a thermoplastic resin of exceptional hardness and transparency having an initial heat distortion of about 135° C. Because of these characteristics, transparent sheets formed from polymerized methyl α-chloroacrylate having unusual durability and resistance to heat and abrasion making the transparent sheets highly desirable for windows in airplanes and other high speed vehicles.

When methyl α-chloroacrylate is employed as the ester in accordance with our invention, the monomeric methyl α-chloroacrylate is mixed with a highly concentrated or substantially anhydrous acid to inhibit or regulate the polymerization of the methyl α-chloroacrylate. A polymerization promoter, such as organic peroxide may be employed. Moreover, light may also be employed as the polymerization promoter, in the presence or absence of other polymerization promoters. The mixture is then subjected to polymerization conditions for a time sufficient to partially polymerize the methyl α-chloroacrylate. The mixture of monomeric methyl α-chloroacrylate and polymeric methyl α-chloroacrylate thus obtained is viscous and smooth flowing. This mixture of monomeric and polymeric methyl α-chloroacrylate is employed as the casting syrup or dope in forming sheets or other shaped articles. When poured into the casting cell or mold and polymerized, the resin sheet dimensions change in accordance with the difference in densities of the casting syrup or dope and final polymer, but the resin sheet obtained is found to have suffered substantially no further change in dimension due to leakage of the casting syrup or dope from the casting cell or mold. Examples of inorganic acids which may be employed in accordance with our invention are hydrochloric, hydrobromic, hydriodic, hydrofluoric, phosphoric and sulfuric acids. It is essential that sufficient acid be employed in order to obtain the desired regulating and inhibiting effects on the polymerization of the α-chloroacrylate ester. We have found that said regulating and inhibiting effects may be obtained by employing 0.001 mole percent to 2.0 percent and preferably a range of from 0.01 mole percent to 1.0 mole percent. After suitable heat cure and removal of the sheet from the mold, polymer sheets with excellent surface characteristics were obtained.

Our invention is also applicable for regulating and inhibiting the polymerization of compositions high in methyl α-chloroacrylate, for example, copolymers containing about 80 mole percent of methyl α-chloroacrylate or higher.

The following examples, in which parts are by weight unless otherwise indicated, are illustrative of the instant invention and are not to be regarded as in any way limitative.

Example I

To 600 cc. (720 grams) of methyl α-chloroacrylate were added 1 gram (0.139%) of dry HCl and 0.15 gram of recrystallized benzoyl peroxide. The monomer was poured into a 9" x 9" x 1/8" glass casting cell and then heated for 22½ hours at 48° C. and 13¾ hours at 60° C. At the end of this 70½ hour heating period the monomer was still very liquid. The monomer in the cell was finally set up after irradiating the cell with six fluorescent sunlamps (40W, Westinghouse) for an additional 47 hours.

Example II

To 480 grams of methyl α-chloroacrylate was added 0.144 gram (0.03%) of dry HCl. The monomer was kept at room temperature and in the dark until it was ready to pour. After standing for one hour, 0.025% recrystallized benzoyl peroxide was added to the already slightly viscous monomer. At the time the monomer was poured into a 9" x 9" x 1/8" casting cell which was about 1 hour after the catalyst had been added, the solution was very viscous, but was a smooth-flowing monomer-polymer mixture. After heating the cell for 14¼ hours at 50° C., the monomer was set up.

Example III

To 480 grams of methyl α-chloroacrylate was added 0.144 gram (0.03%) of dry HCl. The monomer was kept at room temperature and in the dark until it was poured into a 9" x 9" x 1/8" glass casting cell. At the time of pouring, which was about 2 hours after the dry HCl had been added to the monomer, the monomer was not quite as viscous as the monomer which also contained 0.025% recrystallized peroxide (as in Example II) but it was also a smooth-flowing monomer-polymer mixture. After irradiating the cell for 13 hours with six fluorescent sunlamps (40W, Westinghouse) the monomer was set up solid.

Example IV

This example shows the effect of acetic, monochloroacetic and trichloroacetic acids upon the catalyzed polymerization of methyl α-chloroacrylate containing 0.025% of benzoyl peroxide.

Flash vacuum distilled monomeric methyl α-chloroacrylate was divided into four 400 cc. portions each of the monomer. To one 400 cc. portion of monomer was added 0.025% of recrystallized benzoyl peroxide and this monomer was poured into casting cell indicated as A. To a second 400 cc. portion of monomer were added 0.025% of recrystallized benzoyl peroxide and 1 mole percent of glacial acetic acid, and this monomer was poured into casting cell B. To a third 400 cc. portion of monomer were added 0.025% of recrystallized benzoyl peroxide and 1 mole percent monochloroacetic acid and this monomer was poured into casting cell C. To the fourth 400 cc. portion of monomer were added 0.025% of recrystallized benzoyl peroxide and 1 mole of trichloroacetic acid and this monomer was poured into casting cell D.

All of the casting solutions were heated in an oil bath at 60° C. until the monomer was 90% polymerized using ultraviolet light when required to promote polymerization, then heated at 120° C. until substantially completely polymerized. The following table shows the time required to bring about the polymerization of the methyl α-chloroacrylate:

| Casting Cell | Acid Added | Polymerization Conditions | |
|---|---|---|---|
| | | To 90% Polymerization | To Complete Polymerization |
| A | None | 12¼ hours 60° C | 24 hours, 120° C. |
| B | 1 mole percent Acetic | 12¼ hours 60° C | Do. |
| C | 1 mole percent Monochloroacetic | 23 hours 60° C. 13½ hours U.V. light irradiation. | Do. |
| D | 1 mole percent Trichloroacetic | 23 hours 60° C. 65 hours U.V. light irradiation. | Do. |

The results obtained showed that as the strength of the acid increased the inhibitory effect of the acid increased when the acid was used in concentrations sufficient to have an inhibiting effect.

It is to be understood that the foregoing detailed description is given merely by way of illustration and that many variations may be made therein without departing from the spirit of our invention.

Having described our invention what we desire to secure by Letters Patent is:

1. In a method of controlling the rate of polymerization of a monomeric α-chloroacrylic acid ester, selected from the group consisting of alkyl esters, alkenyl esters, polyhydric alcohol esters, cycloalkyl esters, aralkyl esters, aryl esters and tetrahydrofurfuryl ester, when subjected to polymerization conditions, the improvement which comprises adding from 0.001 mole percent to 2.0 mole percent of an anhydrous inorganic acid, selected from the group consisting of hydrochloric, hydrobromic, hydriodic, hydrofluoric, phosphoric and sulfuric acids, to a mixture of the monomeric α-chloroacrylic acid ester and an organic peroxide as polymerization catalyst.

2. A method as defined in claim 1 wherein the α-chloroacrylic acid ester is methyl α-chloroacrylate.

3. In a method of controlling the rate of polymerization of a monomeric α-chloroacrylic acid ester, selected from the group consisting of alkyl esters, alkenyl esters, polyhydric alcohol esters, cycloalkyl esters, aralkyl esters, aryl esters and tetrahydrofurfuryl ester, when subjected to polymerization conditions, the improvement which comprises adding from 0.001 mole percent to 2.0 mole percent of dry concentrated hydrochloric acid to a mixture of the monomeric α-chloroacrylic acid ester and an organic peroxide as polymerization catalyst.

4. A method as defined in claim 3 wherein the α-chloroacrylic acid ester is methyl α-chloroacrylate.

5. A casting composition containing a monomeric α-chloroacrylic acid ester, selected from the group consisting of alkyl esters, alkenyl esters, polyhydric alcohol esters, cycloalkyl esters, aralkyl esters, aryl esters and tetrahydrofurfuryl ester, wherein the rate of polymerization of said ester is regulatable, comprising a mixture of said ester, an organic peroxide as polymerization catalyst, and an anhydrous inorganic acid, selected from the group consisting of hydrochloric, hydrobromic, hydriodic, hydrofluoric, phosphoric and sulfuric acids, in an amount of from 0.001 mole percent to 2.0 mole percent.

6. A casting composition in accordance with claim 5 wherein the α-chloroacrylic acid ester is methyl α-chloroacrylate.

7. A casting composition containing a monomeric α-chloroacrylic acid ester, selected from the group consisting of alkyl esters, alkenyl esters, polyhydric alcohol esters, cycloalkyl esters, aralkyl esters, aryl esters and tetrahydrofurfuryl ester, wherein the rate of polymerization of said ester is regulatable, comprising a mixture of said ester, an organic peroxide as polymerization catalyst, and dry concentrated hydrochloric acid in an amount of from 0.001 mole percent to 2.0 mole percent.

8. A casting composition in accordance with claim 7 wherein the α-chloroacrylic acid ester is methyl α-chloroacrylate.

9. A method of producing shaped materials with an α-chloroacrylic acid ester, which comprises forming a casting solution consisting essentially of monomeric α-chloroacrylic acid ester, selected from the group consisting of alkyl esters, alkenyl esters, polyhydric alcohol esters, cycloalkylesters, aralkyl esters, aryl esters and tetrahydrofurfuryl ester, an organic peroxide as polymerization catalyst and an anhydrous inorganic acid, selected from the group consisting of hydrochloric, hydrobromic, hydriodic, hydrofluoric, phosphoric and sulfuric acids, in an amount of from 0.001 mole percent to 2.0 mole percent, subjecting said mixture to polymerization conditions to partially polymerize said ester whereby a viscous, smoothly flowing mixture of monomeric α-chloroacrylic acid ester and polymeric α-chloroacrylic acid ester is formed, supplying said latter mixture to a casting cell and completing the polymerization thereof.

10. A method in accordance with claim 9 wherein the α-chloroacrylic acid ester is methyl α-chloroacrylate, the polymerization catalyst is benzoyl peroxide and the acid is dry hydrochloric acid.

References Cited in the file of this patent

UNITED STATES PATENTS

| | | |
|---|---|---|
| 2,255,483 | D'Alelio | Sept. 9, 1941 |
| 2,338,967 | Pollack | Jan. 11, 1944 |
| 2,686,174 | Anspon et al. | Aug. 10, 1954 |
| 2,729,615 | Bloom et al. | Jan. 3, 1956 |